J. W. KOHLHEPP.
FLEXIBLE DEHAIRING WHEEL.
APPLICATION FILED OCT. 10, 1919.
1,332,401.
Patented Mar. 2, 1920.
2 SHEETS—SHEET 2.
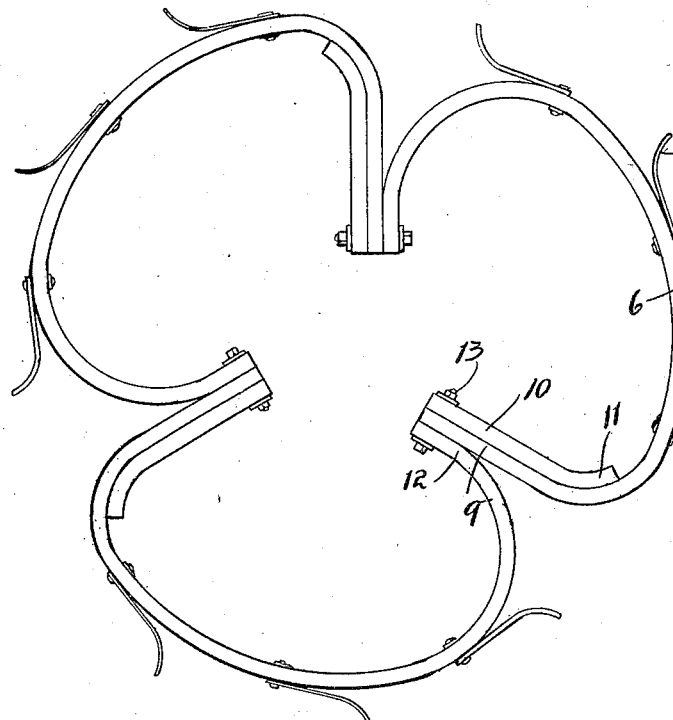
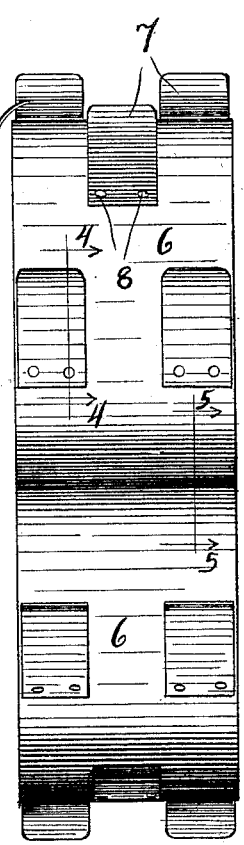
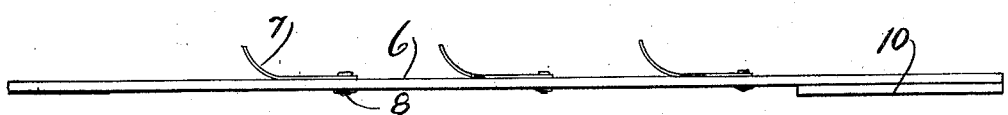
Witnesses
J. L. Ingram
Charles O'Neill Jr.
By
Inventor
John W. Kohlhepp
Charles O'Neill Atty

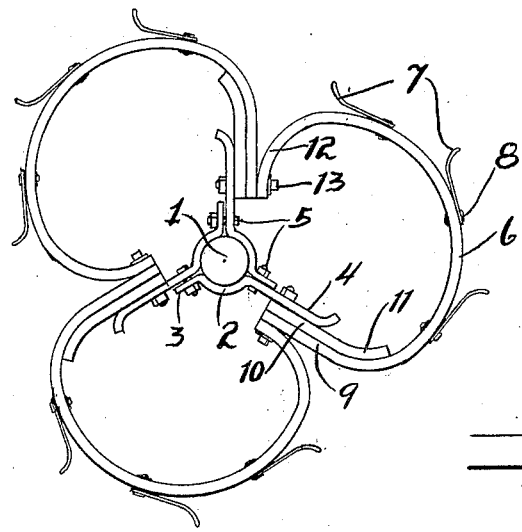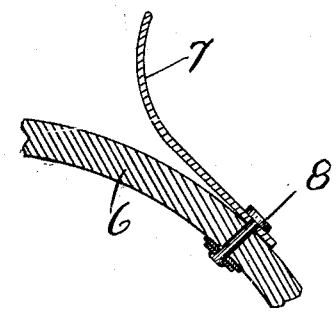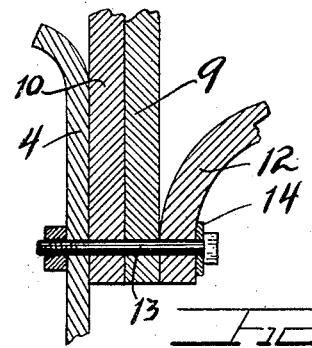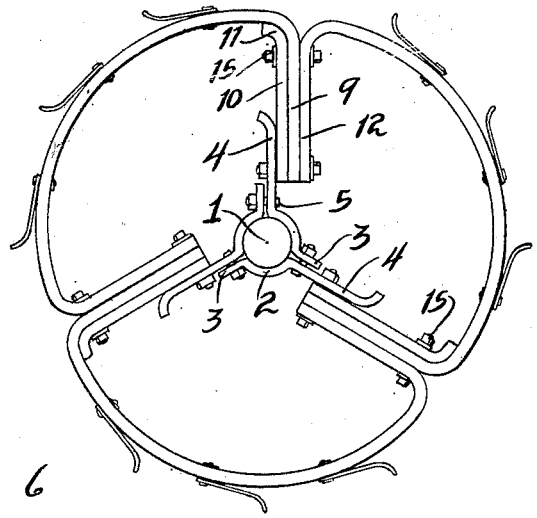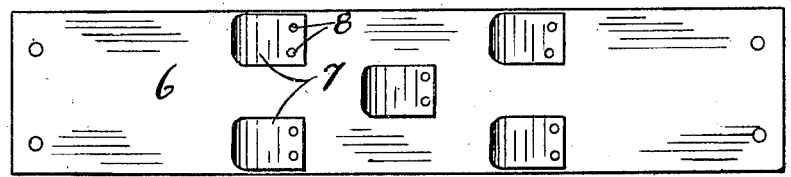

UNITED STATES PATENT OFFICE.

JOHN W. KOHLHEPP, OF CHICAGO, ILLINOIS, ASSIGNOR TO THE ALLBRIGHT-NELL COMPANY, A CORPORATION OF ILLINOIS.

FLEXIBLE DEHAIRING-WHEEL.

1,332,401.  Specification of Letters Patent.  Patented Mar. 2, 1920.

Application filed October 10, 1919. Serial No. 329,686.

*To all whom it may concern:*

Be it known that I, JOHN W. KOHLHEPP, a citizen of the United States, and a resident of the city of Chicago, in the county of Cook and State of Illinois, have invented certain new and useful Improvements in Flexible Dehairing-Wheels; and I do hereby declare that the following is a full, clear, and exact description of the same, reference being had to the accompanying drawings, and to the numerals of reference marked thereon, which form a part of this specification.

This invention relates more particularly to a flexible carcass dehairing wheel wherein a plurality of flexible loops are connected to one another to form a scalloped rim having radial arms which are reinforced on one side thereof.

It is an object of this invention to provide a scalloped flexible dehairing wheel.

It is also an object of the invention to provide a flexible dehairing wheel constructed of loops the ends of which are connected together.

Another object of the invention is the construction of a dehairing wheel rim wherein a plurality of flexible scallops having scraping blades mounted thereon, are secured to one another and reinforced at the advance sides.

It is a further object of this invention to provide a scalloped flexible dehairing wheel rim adapted to be removably mounted on a hub member.

It is furthermore an object of this invention to provide a dehairing wheel rim, the flexible members comprising the same being adapted to be readily dismembered to permit shipment in compact form.

It is an important object of this invention to provide a flexible carcass scraping or dehairing rim the scalloped members forming the same adapted to have the ends thereof removably secured to different arms of a mounting spider.

Other and further important objects of this invention will be apparent from the disclosures in the specification and drawings.

The invention (in a preferred form) is illustrated in the drawings and hereinafter more fully described.

On the drawings:

Figure 1 is a side elevation of a flexible dehairing wheel embodying the principles of this invention.

Fig. 2 is a similar enlarged elevation of the wheel with the mounting spider removed.

Fig. 3 is a front elevation thereof.

Fig. 4 is an enlarged detail section taken on line 4—4, of Fig. 3.

Fig. 5 is an enlarged detail section taken on line 5—5, of Fig. 3.

Fig. 6 is a plan view of one of the flexible rim members.

Fig. 7 is a side view thereof.

Fig. 8 is a side elevation of a modified form of the device.

As shown on the drawings:

The reference numeral 1, indicates a shaft, having removably mounted thereon a mounting hub or spider comprising a plurality of similarly constructed castings or sections each embracing a curved body portion 2, having a short straight arm 3 integral with one end thereof, and a long curved arm 4, integral with the other end. The short and the long arms 3 and 4, of adjacent spider sections are removably secured together by bolts 5, or other suitable means.

The flexible scalloped wheel rim of this invention comprises a plurality of strips of fabric or other flexible material. Each strip is looped to provide a bight or curved portion 6, on the outer surface of which a plurality of outwardly curved scraper blades 7, are secured in staggered relation by means of rivets or bolts 8. One end of each beater strip is turned inwardly to afford an advance arm 9, adjacent the inner surface of which is disposed a flexible reinforcing strip 10, made of fabric or other suitable material. The outer end of each reinforcing strip 10, is curved at 11, to conform to the curvature of the bight 6 of the beater strip. The other end of each beater strip is bent inwardly to form a trailing arm 12.

As clearly shown in Fig. 1, when assembled the trailing arm 12, of one beater rim strip is disposed adjacent the outer surface of the advance arm 9, of an adjacent beater strip. The reinforcing strip 10, of said second beater strip is positioned between the advance arm 9, and one of the mounting spider long arms 4. The various members 4, 10, 9 and 12, are provided with apertures, which register with one another when said members are assembled as described. Bolts 13 and washers 14, are used to removably hold the flexible beater strips and reinforcing strips secured to the mounting spider arms 4, as shown in Fig. 5, and a dehairing wheel is thus formed embracing a flexible scalloped rim, reinforced by the flexible strips 11, positioned behind the advance arms 9, of the rim loops.

The modified form of the device disclosed in Fig. 8, is similar to that already described, with the exception that additional bolts 15, are used to removably secure the reinforcing strip 10, and the advance arm 9, of one looped beater strip to the trailing arm 12, of another looped beater strip. The beater rim resulting from this construction is more nearly circular than the form disclosed in Fig. 1.

In both forms of the device the trailing arm 12, of one rim strip and the reinforcing strip 10 and advance arm 9, of another rim strip, form an inwardly directed or radial mounting arm adapted to be removably attached or connected with any suitable type of a mounting hub or spider.

Attention is directed to the simple construction of the rim members, permitting the same to be rapidly disconnected from one another and laid out in extended form, as shown in Figs. 6 and 7, to permit convenient packing and shipping of the rim members. It will be noted that both ends of the rim strips are not secured to the same arm 4, of the mounting spider, but that each end of said rim strips is removably secured to different arms 4, of the mounting spider.

I am aware that numerous details of construction may be varied through a wide range without departing from the principles of this invention, and I therefore do not purpose limiting the patent granted otherwise than necessitated by the prior art.

I claim as my invention:

1. A scalloped dehairing wheel rim, comprising a plurality of looped flexible dehairing strips secured to one another.

2. A dehairing wheel, comprising a plurality of looped strips secured to one another to form a scalloped rim, and scraping blades on said strips.

3. A carcass cleaning wheel embracing a plurality of looped flexible strips, beater blades secured on the outer surface of each of said strips, reinforcing strips engaged against the inner surface of the advance ends of said strips, and means for removably holding the trailing end of one strip to the reinforcing strip and advance end of another strip to form a scalloped flexible wheel rim.

4. A carcass dehairing wheel comprising a plurality of looped flexible beater mechanisms, and means connecting one end of each of said looped mechanisms with one end of another of said looped mechanisms to form inwardly directed mounting arms.

5. A carcass dehairing wheel comprising a plurality of looped rim strips, scraping blades secured thereon and directed outwardly, and means for removably securing the ends of said strips together to form inwardly directed mounting arms.

6. A carcass dehairing device comprising a plurality of looped flexible rim strips, scraping blades secured thereon, means for securing the ends of said strips together to form mounting arms, and means connected with each of said mounting arms to reinforce the same.

7. In a carcass dehairing wheel the combination with a mounting spider, of a flexible scalloped dehairing rim removably attached thereto.

8. In a carcass dehairing wheel the combination with a mounting spider, of a reinforced flexible scalloped rim removably attached thereto, and scraper members on said rim.

9. A carcass cleaning wheel comprising a mounting, arms formed thereon, a plurality of looped flexible rim strips mounted with the opposite ends thereof removably secured to different ones of said mounting arms and to different rim strips, reinforcing members for said looped strips, and scraping blades secured on said looped strips.

10. A carcass dehairing wheel comprising a mounting spider provided with radial arms, and a plurality of flexible looped scraper rim mechanisms having the ends thereof removably connected to different ones of said spider arms and to different rim mechanisms.

In testimony whereof I have hereunto subscribed my name in the presence of two subscribing witnesses.

JOHN W. KOHLHEPP.

Witnesses:
LAWRENCE REIBSTEIN,
FRED E. PAESLER.